US008996319B2

(12) United States Patent
Cokonaj

(10) Patent No.: US 8,996,319 B2
(45) Date of Patent: Mar. 31, 2015

(54) INTEGRATED PHASED ARRAY TRANSDUCER, SYSTEM AND METHODOLOGY FOR STRUCTURAL HEALTH MONITORING OF AEROSPACE STRUCTURES

(75) Inventor: Valerijan Cokonaj, Madrid (ES)

(73) Assignee: Aernnova Engineering Solutions Iberica, San Chinaro (Madrid) (ES)

( * ) Notice: Subject to any disclaimer, the term of this patent is extended or adjusted under 35 U.S.C. 154(b) by 519 days.

(21) Appl. No.: 13/401,002

(22) Filed: Feb. 21, 2012

(65) Prior Publication Data

US 2012/0253698 A1 Oct. 4, 2012

(30) Foreign Application Priority Data

Feb. 18, 2011 (EP) .................................... 11382045

(51) Int. Cl.
*G06F 19/00* (2011.01)
*B06B 1/06* (2006.01)

(52) U.S. Cl.
CPC .................................. *B06B 1/0622* (2013.01)
USPC ........................................................ 702/39

(58) Field of Classification Search
CPC ..... A61B 10/02; A61B 18/20; A61B 1/00016
USPC .................................. 702/39, 130, 182–185
See application file for complete search history.

(56) References Cited

U.S. PATENT DOCUMENTS

| | | | | |
|---|---|---|---|---|
| 7,302,866 | B1 * | 12/2007 | Malkin et al. | 73/862.041 |
| 7,379,392 | B1 | 5/2008 | Benjamin | |
| 2007/0018083 | A1 | 1/2007 | Kumar et al. | |

FOREIGN PATENT DOCUMENTS

| | | | |
|---|---|---|---|
| EP | 1 453 103 | A2 | 9/2004 |
| EP | 11 38 2045 | | 2/2012 |
| WO | WO 2006/041513 | A1 | 4/2006 |

* cited by examiner

*Primary Examiner* — Edward Raymond
(74) *Attorney, Agent, or Firm* — Lawrence G. Fridman

(57) ABSTRACT

The invention provides an integrated Phased Array (PhA) structural radar transducer, permanently bonded to a structure, that can provide reliable electromechanical connection with corresponding miniaturized electronic SHM device installed above it. The integrated PhA transducer consists of a set of aligned piezo-electric discs with wrap around electrodes for transceiving of elastic ultrasonic waves, plurality of electrical traces and contact pads, several layers of a flexible printed circuit board, electromagnetic shielding between channels and overall, one electromechanical multi-pinned connector and all that integrated into one small unit easy for surface installation by bonding and final application on real structures. The integrated PhA transducer, as a key component of SHM (Phased Array Monitoring for Enhanced Life Assessment) system, has two principal tasks to reliably transceive elastic waves and serve as a reliable sole carrier or support for associated sophisticated SHM electronic device attached above.

11 Claims, 8 Drawing Sheets

INTEGRATED PHASED ARRAY TRANSDUCER, SYSTEM AND METHODOLOGY FOR STRUCTURAL HEALTH MONITORING OF AEROSPACE STRUCTURES

REFERENCE TO RELATED APPLICATIONS AND PRIORITY CLAIM

THIS PATENT APPLICATION CLAIMS PRIORITY OF EUROPEAN PATENT APPLICATION NO. 11382045 FILED Feb. 18, 2011.

FIELD OF THE INVENTION

The present invention relates to the field of engineering in general, and in particular it relates to the field of detection and monitoring of internal and external structural damages.

BACKGROUND OF THE INVENTION

Structural health monitoring with ultrasonic phased array structural radar technology has already proved its high potential for damage detection. The advantage of these active-passive phased array SHM technologies is that there is no need to install a plurality of transducers all over the structure to be monitored, but only limited array assemblies at certain localized areas that can inspect wide structure areas without compromising the surface clearance. By proper electronic beam-forming, signal acquisition and image reconstruction algorithms similar to radars or sonar, an ultrasonic image of the wide structure areas or its interior can be obtained. In order to be able to apply this technology efficiently on real structures and in real service environments many additional problems are to be solved first. The first one is a lack of integrated phased array transducer that once installed on the structure, can provide at all moment reliable signal integrity, necessary signal quality and reliability, reliable energy transducing functionalities and carry necessary integrated hardware for structural health monitoring with possibility to disconnect easily on demand. Present SHM systems based on different SHM technologies in general, always, consist of a plurality of transducers or sensors, multiple cables from each one of them connected to a centralized multi channel bulky equipment necessary for generation, sensing, conditioning, amplification, multiplexing, conversion, triggering, processing, signals storage or communication. This centralized SHM hardware is intended to be positioned and fixed in a certain place on board and more or less far away from the sensors/transducers. These kinds of centralized SHM systems of course are not always very attractive to the clients, aircraft manufacturers, operators, maintenance providers or crew cabin. The main reasons are "lots of cables" and associated time and money cost for proper cabling, relation between corresponding induced costs and performance benefits per added SHM system mass, need to assure a special free space on board or moreover need to design and fix additional support structure just for the installation of the bulky SHM equipment, etc. All these reasons make these conventional kinds of SHM systems unfeasible and impracticable (especially in aerospace sector) for SHM applications during manufacturing, curing or assembly which are also considered as critical phases of a structure life cycle and are prone to accidental damages, disbands, over stresses, plasticities, material deteriorations and the like.

From the sensor assembly described in U.S. Pat. No. 7,302,866 by The Boeing Company, it is clear that it is foreseen mainly for SHM on ground applications, on external easy accessible aircraft surfaces and is not envisaged for continuous structural health monitoring. The connection of corresponding SHM system with the sensor is done manually through special interface module taking always care on correct alignments and pressure based electric multi pads contact integrity. Once acquired necessary SHM data, the interface module should be manually disconnected and proceed with the same process to all other phased array sensors. These sensor assembly, SHM system and SHIM methodology still requires substantial manpower implication and are clearly not suitable for continuous real time SHM on structures in real service environments like flight, movements, vibrations, electromagnetic interferences, adverse weather or environmental conditions, etc.

From the sensor network with embedded electronics described in US 2007/0018083 A1 by the Acellent Technologies the concept of distributed electronics for SHM is introduced but the proposed solution still uses cables or wires (not shown) to connect sensors with the electronics or tries to embed this local electronics into a flexible layer without resolving how. The solution to the common connection problem, in order to be able to function in harsh environments, between small delicate transceivers and rigid electronics is not offered. Also from the invention description it seems that there is no possibility to separate electronics from a transducer once embedded into a layer which of course is not very attractive when electronics fails or there is a need to remove it with another one, resulting with need to remove entire layer together with the electronics.

The component evaluation system for SHM disclosed by The Boeing Company within U.S. Pat. No. 7,822,258 B2 comprise a plurality of piezoelectric transducers within the composite structure component, a transceiver circuit, a switch box for coupling analog to digital monitoring hardware, where said monitoring hardware seems to be referred to one central and common personal computer per one switch box and one transceiver circuit. From the proposed structure of this evaluation system it is clear that the system is not foreseen for aircraft lifetime embarking, inspection of entire mobile platform, to monitor plurality of transducers in real time or make possible on board inspection during real structure service. With the proposed evaluation system structure, it seems that mainly on ground inspections and based on monitoring one by one transducer could be performed, once the mobile platform stationary. It also assumes necessary use of cables for connection of transducers and systems components. The problem of reliable and permanent connections of rigid switch box with a plurality of sensitive small transducers is not proposed. The need to embed one or more layers with distributed array of transducers within the composite structure in order to inspect the structure interior does not seem very attractive due to the need to change actual manufacturing processes or certify new ones. Additionally, embedding of distributed layers for sure will change structure or component properties and could be a future potential source of disbonding or damage initiation. In the proposed SHM method for inspection of composite structures image reconstruction is performed on one central computer and directly from received signals.

Efficient SHM systems in general, due to use of many transducers, require very high generation, acquisition, signal conditioning, processing, memory and communication performances in order to offer quality SHM results easy to interpret. In order to apply them extensively on real aerospace structures in the near future and obtain all potential benefits of their use, mass effective, cost effective, functional SHM systems methodologies with great potential for automation have to be developed. Their mass effectiveness per mass of the structure is of special importance knowing that aircraft payload weight or number of aircraft systems on board is continuously increasing putting more and more difficult requirements onto aircraft structures.

SUMMARY OF THE INVENTION

The present invention is applicable in the engineering fields such as Structural Health Monitoring (SHM), Detection of internal and external damages, Temperature Distribution Mapping (TDM), Stress Distribution Mapping (SDM), Stiffness Distribution Mapping (STDM), Deformation Distribution Mapping (DDM) or Vibration Distribution Mapping (VDM) on structures like aircraft, rotorcraft, watercraft, submarines, spacecraft, vehicles, oil or gas ducts, tanks, platforms, barrels with nuclear waste, etc. Other high potential engineering attractive application fields are related with monitoring of Impact Detection, Leakage Detection, Mass Losses or Characterization of structure material physical properties during structure life cycle for possible material degradations due to service in adverse environments. For those skilled in the SHM art, it is quite possible to appreciate various useful advantageous applications of the invention in other fields in the near future.

The invention, as a key component of structural radar based SHM systems, as for example SHM, is intended to be applied on already existing structures or components and also on new ones, in order to make possible the following objectives: a) reduce direct maintenance costs and labour effort associated with the use of common non destructive methods to assess structural integrity, b) simplify and optimize future maintenance models and make possible real Condition Based Maintenance (CBM) in order to achieve considerable reduction of scheduled maintenance (especially important for aircraft operators or (airliners) and aircraft down time, c) increase operational performance and structure availability at minimal cost for the end user, d) increase or enhance transportation safety especially for critical structures in critical service environments, regimes and missions, critical load cases or service regimes (like spacecraft and aircraft for example), e) increase quality assurance of the final product—(sub)structure or component, f) improve and make possible real in situ structural health monitoring of Damage Tolerant Structures (DTS), for example for upcoming new generation aircraft, g) measure structural ageing and acquire structure operational performance data, the input necessary for assessment of consumed structure life, prognosis of remaining life and possible extension of aging structures or aircraft, h) optimize (for shape and mass) future structures by use of Fully Stressed Design (FSD) approach through use of operational stress distribution maps obtained in a plurality of real service environments (important input for design and stress engineers), i) identify critical structure areas during service of the structure in real environments, j) provide additional added value to future structures by development of intelligent self sensing and self maintainable structures, k) reduction of Time To Market (TTM) and total life cycle cost through cancelling of all common Non destructive Testing, Evaluations and Inspections (NDT/NDE/NDI), taking place, for example, during fatigue certification tests or critical assembly phases, make easier and more precise identification of real causes of possible structural damages or defects so the most effective countermeasures would be selected timely and directed toward solutions of real problems and not just temporary solution "patches", m) significantly reduce actual work effort for maintenance providers associated with the maintenance of structures or assessment of its structural integrity, n) have valuable information about structure integrity, consumed or remaining life at all moment (important information for assurance or leasing companies, structure purchasers, retailers or maintenance providers), etc.

The present invention seeks to overcome the disadvantages and deficiencies of prior art phased array transducer construction and corresponding SHM system and methodologies by integrating innovative functional components into transducer with the consequence of new SHM system applications and operational methodologies, in many characteristics much more attractive for real extensive aerospace structure applications than the ones offered by the prior art.

In accordance with one embodiment of the present invention, an integrated phased array transducer is presented that can reliably transceive waves into/from the structure and early above electromechanically connected SHM device. The integrated PhA transducer comprise an array of wrap around piezo-electric disks, a plurality of conductive wire traces guiding electric signals from said disks to electric contacts, a plurality of adhesive contacts coupling said piezo-electric disks and said wire traces with said contacts, a plurality of holes in each of the layers for allowing said contacts, and several electrically non-conductive layers for integration or encapsulation purposes. Additionally the integrated PhA transducer comprises an electrically non conductive flexible layer for level equalization with extended hole allowing unrestricted actuation of piezo-electric disks in radial direction.

In another embodiment, the PhA transducer also comprises a electromechanical connector accessible on the upper side for electromechanical coupling, having soldering pins properly connected to the plurality of conductive wire traces on the lower side and a stiffening ring integrated around the electromechanical connector bonded onto the encapsulation layers. These particular features qualify an integrated PhA transducer for reliable electromechanical coupling with above SHM device and support of associated transferred loads, once transducer properly bonded to the surface and structure in service.

In further embodiment, the PhA transducer comprises a plurality of conductive wire traces forming a closed loop around each one of the signal transmitting wire traces providing thus internal EMI shielding and further more at least two interconnected electrically conductive layers for external EMI shielding, a lower and upper layer, wherein of these layers are made of a suitable plastic material embedding a conductive mesh or woven fabric of a material selected from the group of aluminium, copper and nickel.

In still another embodiment, the PhA transducer comprises at least one integrated multi-pinned electromechanical connector, where each comprise at least two threaded holes for mechanical fastening with the SHM device by screws. Further more, integrated PhA transducer is flexible enough to be bonded onto a curved surface and once bonded stiff enough to carry above corresponding SHM device, supporting associated transferred inertial loads, assuring at all moment during structure service life, reliable electromechanical interconnection.

In an additional embodiment, the PhA transducer comprises an identification tag which could be printed and/or stored in a small chip integrated within transducer, wherein printed or stored information comprise all necessary information about transducer physical properties or characterization features important for adjustments of SHM device configurations, signal processing and algorithms for image reconstruction and analysis of structural integrity.

In a further embodiment, the PhA transducer comprises an easily perceptible horizontal and vertical alignment markers allowing to verify the correct positioning during bonding procedure, of the center lines of the piezo-electric discs array of the transducer onto the host structure and in accordance with other structure features, like holes, stiffeners, edges, etc.

In accordance with a further aspect of the invention, the integrated PhA transducer is a SHM system based on a plurality of in situ distributed SHM sets, where each set can transceive waves to/from the structural surface, wherein each set consists of one integrated phased array transducer and one SHM electronic device electromechanically coupled and attached directly above through compatible electromechanical connector wherein each SHM electronic device, once powered and activated performs tasks: signal generation, signal acquisition, signal conversion, signal conditioning, signal triggering, multiplexing, digital signal processing, 2D and 3D image reconstruction and generation, data storage, data management, data analysis and data transmission. These listed tasks are necessary to provide clients with easy to interpret information full images comprising at least one of the herein mentioned data: Structural Health Monitoring Maps, Stress Distribution Maps, Stiffness Distribution Maps, Temperature Distribution Maps, Deformation Distribution Maps, Vibration Distribution Maps, Impact Detection, Leakage, Material Characterization or host structure Mass Loss.

In another preferred embodiment there is presented a method for obtaining data about structural health, integrity, condition or structural performance from the structure by use of the disclosed SHM system, comprised by plurality of in situ distributed integrated phased array transducers and SHM devices, wherein each one of these SHM sets is capable to cover a certain inspection area, defined by a host structure features and SHM set performance, where the SHM methodology comprises the hereinafter detailed steps. The first step is proper preparation of surface for bonding in order to permanently and properly install integrated phased array transducer, preferably by bonding, on a specific inspection sector of the host structure. Then, it is necessary to repeat the previous step for each integrated PhA transducer of the entire SHM system. Than follows attachment of the SHM electronic device(s) with compatible connector above the PhA transducer(s), proper electromechanical connection and secure for untightening. Electrical powering of the SHM device(s) and activation is necessary in order to perform by each SHM device signal generation, signal acquisition, signal conversion, signal conditioning, signal triggering, high speed channel multiplexing, etc. Further more, digital signal processing is directly performed by SHM devices where this processing may include signal averaging, signal de-noising, time and frequency filtering, calculation of attenuations, wave velocities, time of flight tables, calculation of temperature and stress effects, etc. The step further is entrance with prepared signals and calculated data from the previous step into SHM algorithms for image reconstruction embedded in the SHM devices in order to generate maps for SHIM, Stress Distribution Maps, Stiffness Distribution Maps, Temperature Distribution Maps, Deformation Distribution Maps, Vibration Distribution Maps, Impact Detection Maps, Leakage Maps, Material characteristics and/or structure mass loss maps, wherein needless data is erased in order to make free place to store signal from subsequent acquisitions. Then follows the transfer of generated maps by wires or/and wirelessly from each SHM device to at least one on board receiver device with display and proper visualization tools installed. Next in the procedure is an assembly and projection of all received maps from each inspection sector and SHM device into a 3D model of the structure, by placing each map to a corresponding position inside the 3D model in order to provide easier interpretation and analysis of entire structure integrity, stress distribution, temperature distribution, stiffness distribution or other useful data like impact or leakage detection. Optional step could be transfer of new versions of DSP tools, image reconstruction algorithms or software for embedding, from receiver device to each SHM device by use of the same communication pathways as used for transfer of the SHM maps in order to install or embed new DSP tools, algorithms or software on each SHIM device and than continue the KIM methodology with improved software features.

Other aspects and features of the present invention, as defined solely by the claims, will become apparent to those ordinarily skilled in the art upon review of the following non-limited details description of the invention in conjunction with the accompanying exemplary figures.

DETAILED DESCRIPTION OF THE INVENTION

The present invention discloses an innovative integrated transducer for SHM applications and as a consequence, a new methodology for SHM system application on real structures in real service environments. The invention disclosure starts herein first with highlighting all important structural and functional features of each one of integrated PhA transducer constitutive components, then its coupling with the connector compatible SHM electronic device (only partially disclosed here) and finally the SHM methodology of systems subassembly implementation into a real SHM system applied on representative aircraft or other structures. Proposed SHM methodology offers high potential for full system automation, once system installed, powered and activated as detailed hereafter.

Figure 1:
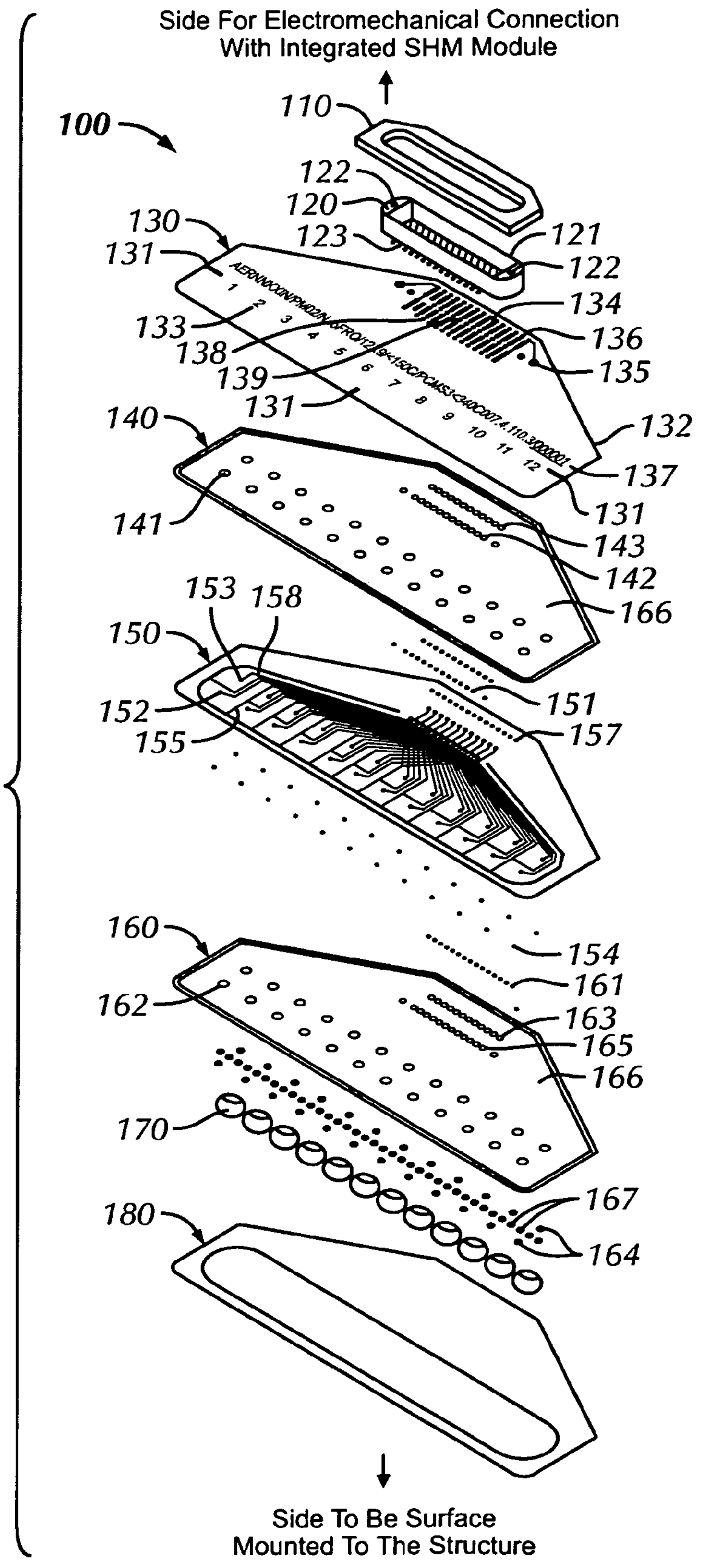
FIG. 1 is an exploded isometric view of an integrated phased array transducer in accordance with one embodiment of the present invention, highlighting all transducer constitutive components.

FIG. 1 highlights in an exploded view all constitutive and preferred structural elements of an integrated phased array transducer assembly 100. All necessary functional details of each one of the components are given in the continuation from the bottom to the top, comprising of the following components: flexible layer 180 for flat bottom level thickness equalization with piezo-electric discs 170, in order to assure best gluing surface quality for coupling of the integrated PhA transducer 100 with the host structure. The layer 180 has one extended hole for a plurality of piezo-electric disks or transceivers 170 and is sized not to have side interior contacts with any of them, to provide sufficient free space for their non restricted actuation in radial direction once adhered, and to make easier and simplified assembly procedure of each piezo-electric disk onto the upper layer 160 with embedded electromagnetic interference (EMI) shielding mesh. This flexible layer 180 could be considered as thickness equalizer or adjustment component of an integrated PhA transducer that could vary depending on the optimum thickness and size of the used piezo-electric disks specially optimized due to characteristics of the corresponding host structure and final PhA transducer 100 applications. In the manufacturing procedure this layer could be joined or sealed with the rest of the layers in the last or penultimate assembly phase. Common flexible layer printed circuit board (PCB) or other suitable materials used in printed boards could be used for this layer 180. The thickness is of course dependent on the thickness of the transceivers array 170.

The following layer 160, the second from the bottom in the FIG. 1, is a bottom part of the overall or external EMI shielding 166 and similar to the layer 140, the upper part of the shielding. The layer consists of an electrically conductive mesh 166, copper web, woven screen or similar EMI application useful materials or components encapsulated into a thin non-conductive layered adhesive (epoxy glue, or similar). Further, the 160 layer has a plurality of small holes 162 positioned above each one of the transceivers with wrap around electrode terminals 170. Electrically conductive glue or epoxy is applied on transceivers contact pads in five points per transceiver (164 and 167), one per each electrode terminal (or more if necessary, dependant on a size of piezo-lectric disks) in order to pass the electric signals, and other three (or more if necessary) 167 to adhere onto the bottom side of the layer with embedded EMI shielding 160. After the connection and insulation tests, the polymerization cure is applied, by heat or other suitable means, together with mechanical pressure applied onto the components, for required gluing quality. It is important to mention that it is possible to apply two different glues (epoxies) or even soldering point for this aim; to pass electrical signals electrically conductive glue in two points (per transceiver, one per electrode) 164, and for piezo-disc connection with the bottom side (other three points 167) any suitable non-conductive glue can be used. Of course this makes manufacturing process more complex and time consuming. The existence of smaller holes 163 is for technological reason, to disable possible short circuit connections with the EMI shielding mesh during the manufacturing process, where requirements to comply with high tolerances (order of several micro meters) are of high importance for the final product quality. These holes 163 and the holes 162 for reaching piezo-discs 170 can be made by borer drilling or laser. The smallest 165 one of the three hole types in the layer 160 are there for electrical interconnection of lower shielding mesh 166 with the upper one in the layer 140, via holes 157, 143 in the layers 150, 140 respectively, and also for shielding of main connector wires 123 from a side. Electrical interconnection is coupled by electrically conductive glue applied in contacting points 161. As a connector 120 is very close to the shortest of transducer 100 edges, a Faraday shield is in this place made by such a vertical mesh.

The next layer 150, third from the bottom in the FIG. 1, carries signal wires or traces 156 for each one of the channels and electrodes, together with wires 155 between them, for EMI shielding of each one of the channels, all that embedded or encapsulated into a thin non-conductive layered adhesive (epoxy glue, or similar) 150. With these channel EMI shielding wires 155 on the both sides, lower and upper shielding mesh 166, Faraday shield or cage encloses each one of the signal wires 156, thus ensuring proper electromagnetic (EM) and EM cross talk protection between each of the channels, and from possible external electromagnetical radiation or interferences, once the transducer in use in real service environments. Electrically conductive glue in contacting points 154 is used for electrical connection of the piezo-disks 170 with the contact pads 153 and 152 through respective holes 162 and electrical contacts 164 in the layer 160. Further, electrical contacts between layers 150 and 130 are assured again by application of electrically conductive glue in respective point 151.

Further, a layer higher is an upper overall EMI shielding layer 140, similar to the layer 160, with encapsulated electrically conductive mesh 166, holes 142 to pass all channels signals, holes 143 for connection of the both EMI shielding meshes 166, while holes 141 have the same task as holes 163, to disable possible short circuit connections with the EMI shielding mesh during the manufacturing process.

The last layer 130, the upper one, contains several important features, principal and auxiliary ones. There is a thin flexible PCB layer 132 with holes to pass all channels signals 138, 139 from a lower layer 140 and the shielding holes 136. The electrode terminals of channels signals are passed above again with a conductive glue or soldering points trough the respective holes 138, 139 and connected with respective soldering pads 134. The EMI shielding is passed through two channels 135 on the extreme pins of the electromechanical connector and connected to corresponding soldering pads on both extremes. Once on the soldering pads checked the correct connection with all signal channels and EMI shielding via all respective PhA transducer layers, holes and contacts mentioned above, an appropriate electromechanical micro connector 120 (for instance Nicomatic serie CMM, male) is soldered above them through corresponding soldering pins 123 in order to have a suitable electronic interface connection with capability to connect or disconnect on demand with compatible SHM device 200 via corresponding electrical pins 121. The electromechanical connector besides these electrical pins 121 has on both extremes two holes 122 with threads in order to also provide reliable mechanical connection with the SHM electronic device through corresponding screws 201 (see FIG. 2, 3), bolts or other mechanical fasteners that can provide reliable mechanical connection in all required service environments.

The auxiliary layer 130 features are horizontal and vertical positioning markers 131, which can be of great help during correct positioning of a transducer 100 while bonding it onto the defined structure inspection sector. Correct alignment of the center lines of the piezoelectric discs array with the original structure features (holes, stiffeners, edges, etc.) during bonding procedure simplifies later monitoring, detection, processing and positioning of all structural geometry features (both original and new ones, like possible damages, cracks, defects, etc.) and can improve the final image quality with all resulting SHM data. Further auxiliary feature, channel numeration 133 specifies a position of respective channels and piezo-discs 170 bellow the PhA transducer 100. This visual information helps a lot when deciding the correct or necessary orientation for coupling the SHM electronic device onto the PhA transducer and when is necessary to reconfigure SHM software for reverse channels option. Also very important auxiliary layer feature is a printed PhA transducer identification tag or mark 137 with basic details, like transducer manufacturer, transducer version, applicable SHM monitoring materials, number of transceivers with the distance between them, maximum service temperature, material of piezo-discs with corresponding Curie temperature, transceivers geometry, transceivers thickness and transducer serial number. The identification tag 137 printing should be done with environment resistive paints, the same as alignment markers. This identification tag could also be stored electronically on a small chip, integrated into the PhA transducer and connected through one of the free channels via electromechanical connector with the SHM device. Both identification tag options could also be used, the printed one for visual verification of the transducer and chip stored for electronic verification once SHM device activated and in service. The mentioned identification tags and stored details are not indispensable for correct functioning of the PhA transducer 100 but could be of huge help in many in field realistic situations, especially, once PhA transducer 100 is permanently bonded on the host structure (for many years) and there is need to know any of this information for reasons like updates or modifications of image reconstruction algorithms, damage detection algorithms, newly developed software tools, etc. or during the installation procedure on a big structure with numerous inspection sectors having many different physical properties. For example, PhA transducer serial number could be of huge help during the correct in field space positioning and installation by technicians.

As PhA transducers are permanently bonded, it is important to carefully check carefully store transducers serial number corresponding to each inspection sector during the installation procedure. The best way would be to relate it with a 3D geometry model of the structure in order to be sure always where the information is coming from and make easier input for correct final image assembly procedures.

The reinforcement or stiffening ring 110 for mechanical reinforcement of the interface between electromechanical connector and the final PhA transducer flexible printed circuit board (PCB) is one of the critical functional components of the invention which qualifies the PhA transducer 100 for service in harsh vibration environments commonly encountered on aircraft or rotorcraft. By the proper selection of the stiffening ring 110 physical properties the compromise between stiffness and flexibility has to be achieved, in order to have a PhA transducer 100 flexible enough to be bonded onto common curved aerospace structures and also stiff enough to be able to withstand above it a corresponding SHM electronic device 200 together with associated dynamic inertial forces and moments. PhA transducer resistance to vibrations corresponding to different possible service environments is also a must. Once packed or sandwiched together all above described layers and components, the last component to integrate by gluing, above it, would be an oblong ring, made from a common PCB (with EMI shielding embedded) or other suitable materials used in printed boards. The ring hole is dimensioned due to the size of an electromechanical connector 120, so the ring once inserted around it would match tightly. The non conductive epoxy glue is applied above and between soldering point 138, 136, 135, connector pins 123 and around the lower vertical side of the electromechanical connector 120. After that the ring 110 is aligned properly, inserted above, pressed mechanically and left for final curing into one integrated unity. The final PhA transducer once packed is illustrated on a FIGS. 2 and 3. Besides function of resistance to inertial forces, moments and vibrations, this stiffening ring also provides additional shielding and electromechanical protection of soldering points 138,136 which covers totally. The thickness, shape and the size of this ring could vary due to the final PhA transducer 100 application, mass, inertial moments of the SHM electronic device installed above, vibration levels, other necessary protections, etc. The thickness of this layer should be limited and in accordance with compatible female connector 119 (see FIG. 3) on a SHIM electronic device.

As there is no need to cover the whole structure surface in order to inspect it with phased array structural radar technology by using disclosed PhA transducers, one of the design objective functions for a PhA transducer, besides functional ones mentioned above, is to pack all transducer components into one easy to install integrated unit having a minimum surface for correct functioning. The objective is to cover the less possible surface area of the host structure assuring maximum surface clearance for any other possible works on the structure or its use.

Figure 2:
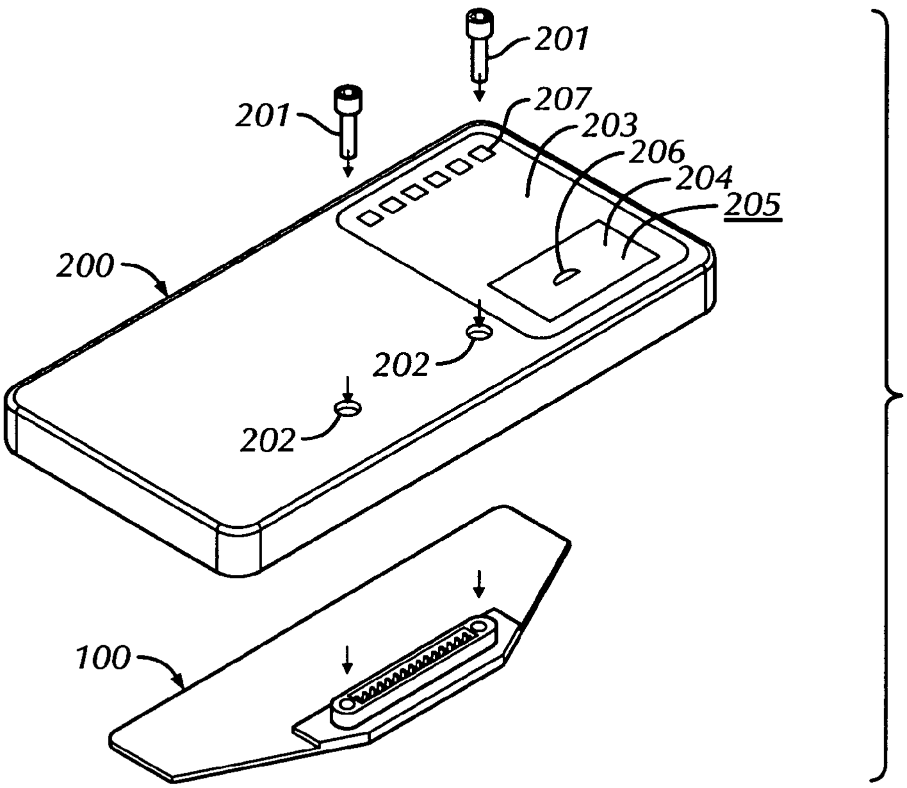
FIG. 2 is an exploded isometric overhead view of one SHM system subassembly, consisting of two main components: SHM electronic device fixed by screws onto integrated PhA transducer.
Figure 3:
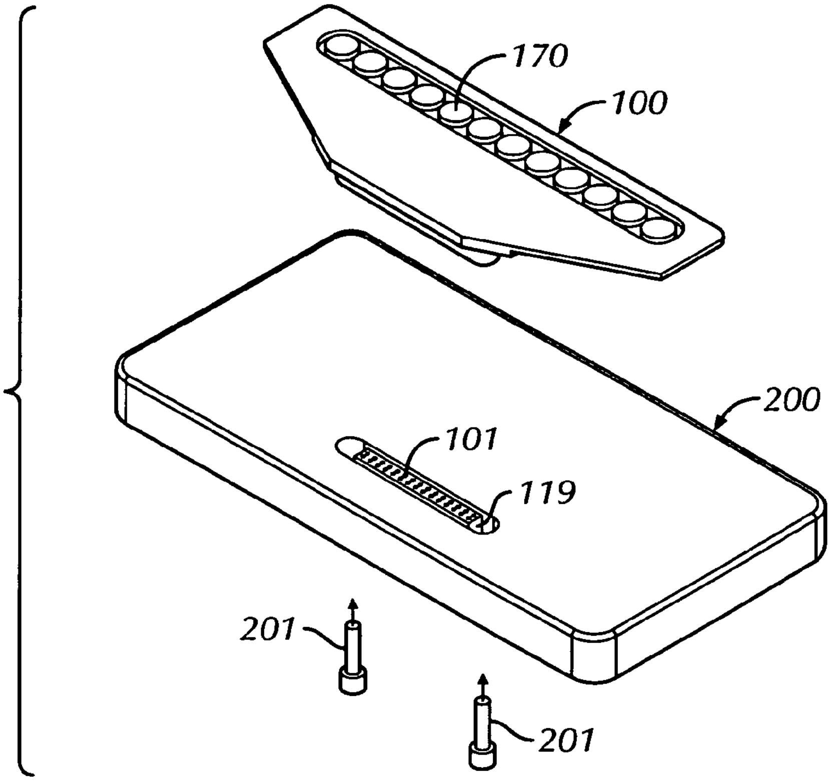
FIG. 3 is an exploded isometric underneath view of one SHM assembly, consisting of two main components: SHM electronic device fixed by securing screws onto integrated PhA transducer.

FIG. 2 and FIG. 3 illustrate further preferred embodiment of the present invention, in which the SHM electronic device 200 presented here as a small box (size and mass of a common mobile phone) having an electromechanical micro connector 119 (for instance Nicomatic CMM serie, female) compatible with the integrated PhA transducer ones 120 (for instance Nicomatic CMM serie, male), are mechanically fixed together by means of suitable fastening screws 201 in order to assure reliable mechanical and electrical connection, for the whole time necessary, once PhA transducer 100 affixed on the host structure (by bonding, embedding, co-curing, etc.). The electrical connection is assured through electrical pins 121 and the corresponding pin holes 101. The SHM electronic device 200 has counter bored holes 202. Inserted screw bodies are fastened through respective threads with the micro connector holes 122. Screws heads have diameter larger than the screw body in order to assure sufficient bearing surface necessary to fasten the SHM device onto the PhA transducer. Once totally fasten the screw bodies and the screw heads preferably in line with the exterior surface of the SHM device, proper and common screws securing procedure (especially in aeronautics) should be applied in order to prevent possible screws untightening due to in service vibrations which could result in loosing electrical contacts and in the worst case separation of the SHM device 200 from the PhA transducer 100 which is of course inadmissible, especially while structure is in service. The mechanical connection by at least two screws 201 should properly secure the tight assembly of PhA transducer and SHM device during entire structure lifecycle which in case of aerospace structures could be even more than 30 years. If course there exists the option to remove it manually without need to touch the PhA transducer, making possible removal of SHM device 200 in case of failure or change for another with better performances, especially justified after many years in service, always having in mind the ongoing trends in electronics industry related with performance improvements by each year. This kind of replacement is conditioned by on ground availability and accessibility to the structure. Once detailed electromechanical connection between PhA transducer and corresponding SHM device, it is important to mention that there could additionally be applied common protection procedures of SHM device and the same connection from high humidity, dust, salt, etc. in order to assure or extend real operative use range. Additionally, extensive knowledge about integrated phased array transducer behaviour in all the range or spectra of possible service environments of monitored structure is of crucial importance for posterior reliable structural health monitoring and other functionalities, mentioned earlier.

Additional exterior possible feature corresponding to the SHM device 200, illustrated on the FIG. 2 is a small tactile display 203 with the possibility to visualize ultrasonic images 204 resulting from SHM inspections directly on the same device and to make necessary configurations through display tool menus 207 in situ on the host structure, without need to send the information farther. Detail 205 illustrates possible visualization of damage on the inspection sector relative to the position of the bonded PhA transducer 206. Display integration into SHM devices could be justified in situations where adjacent SHM sets are quite separated, exist easy access to it, and where there is no need to send this SHM information further. The fact that displays or screens normally consume substantial electrical power, could be a limitation for their implementation on SHM systems (with many SHM sets) to be installed on aircraft structures where available electrical power is quite costly, limited and accessibility is very limited.

A disclosed integrated transducer 100 is intended to be surface mounted or affixed to the host structure only by gluing or co-cured during structure fabrication. Embedding of the PhA transducer 100 is also possible, but is not recommended because embedding process can cause many problems, like for example: local changes in material properties, stress concentrations once mounted; damages on the interface with the host structure, it requires additional tools and host structure preparations, could cause difficulties in replacing or repairing if embedding fails and what is much more important embedding is impracticable for in field installations on already existing structures. Surface mounting of integrated transducer with appropriate techniques and adhesives is preferable because it can also be easily applied on already existing structures, it is quite simple for in field installation of plurality of PhA transducers with use of limited equipment resources, like for example only one vacuum pump, appropriate vacuum suction ups (not presented here) above each one of them and suitable adhesive.

As a result of invented integrated PhA transducer further important invention embodiment is presented and imply a new methodology for SHM based on distributed monitoring for centralized collection and visualization of SHM results in form of reconstructed ultrasonic images showing (in 2D or 3D) information about the structural health, status, condition, performance, impact or leakage location, stress maps, stiffness maps, deformation maps, temperature maps, vibration maps or other. All these information is possible to obtain on basis of a time history records of wave propagation fields in/on the host structure by application of special generation, acquisition and processing techniques. These ultrasonic images are coupled with the 3D structural models offering easy to interpret SHM data. By proposed SHM application and operation methodology, using a plurality of SHM sets covering inspection of an entire structure, requirements for downlink bandwidth together with the associated risks are reduced to minimum. Of course, the requirement for reliable hardware to do that is the must. Ongoing achievements in electronic industry, related with further miniaturizations technologies, reduced power consumption, ever more important performance improvements of all principal components necessary for a functioning of a SHM electronic device (partially disclosed here) based on structural radar techniques, make this new SHM concept very attractive and technically feasible for continuous real time SHM applications on real structures in real service environments.

Figure 4A:
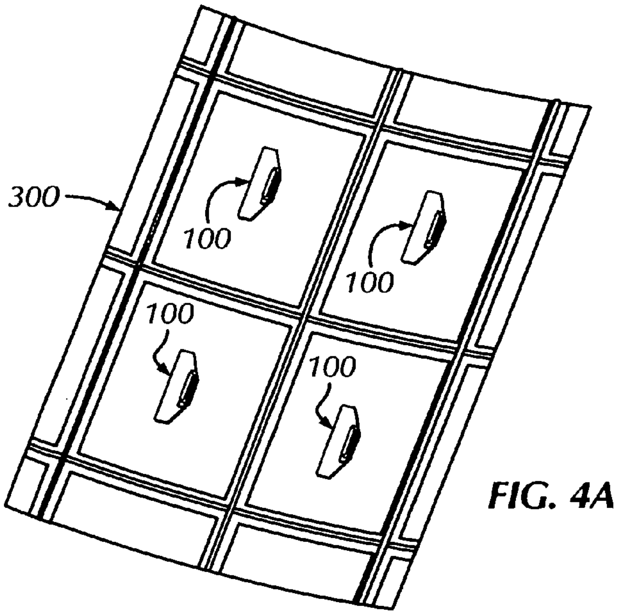
FIG. 4A is an isometric view of a common aerospace structural panel with bonded integrated PhA transducers, one per each panel SHM inspection sector.
Figure 4B:
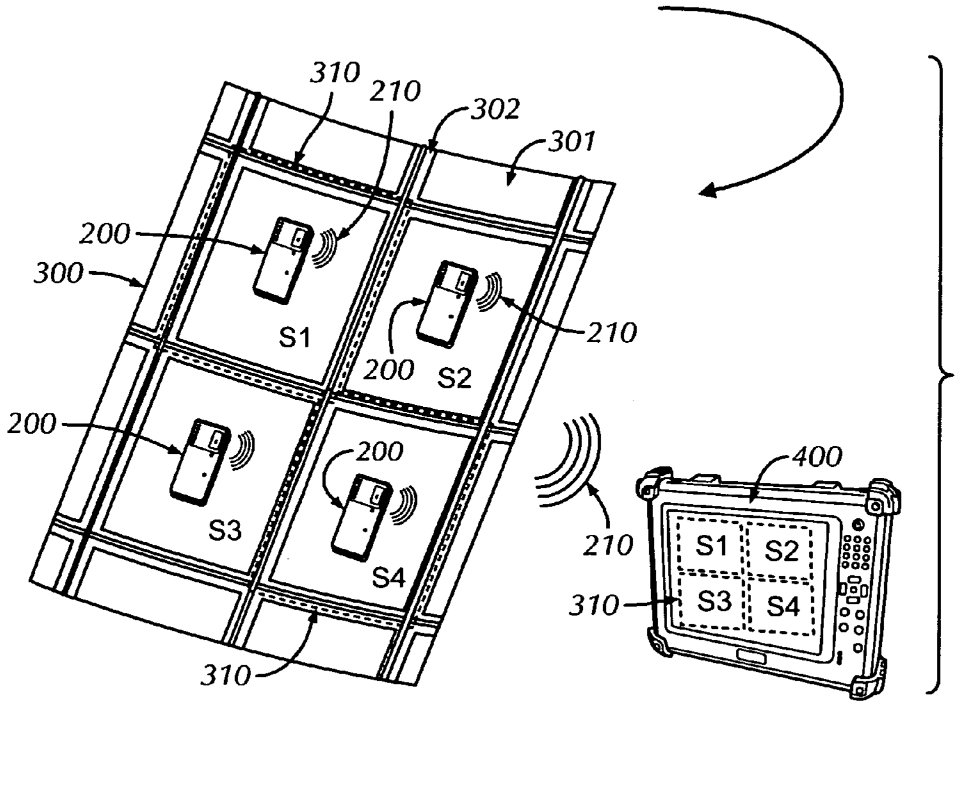
FIG. 4B is an isometric view of a common aerospace structural panel with SHM devices fixed onto integrated PhA transducers, one per each panel inspection sector, and resulting ultrasonic images visualized on a screen.

FIG. 4A, 4B illustrate possible application of a set of disclosed PhA transducers on one common stiffened aerospace structural panel 300 and posterior screw fixation of SHM electronic devices 200. The panel 300 has stiffeners 302 in both directions and the areas enclosed by them could be the desired inspection sectors. By affixing one PhA transducer 100 per each enclosed area, plus SUM device 200 connected, each SHM set 100 & 200) could inspect the skin 301 area enclosed with discontinue lines 310, called panel inspection sector (in this case S1, S2, S3, S4). It is important to mention that there should be a certain level of overlapping in inspection (monitoring) coverage between different sets, in order to inspect the entire panel skin 301 efficiently and assure that there are no areas on the panel 300 without inspection coverage. The inspection area covered by one SHM set (100 & 200), PhA transducer 100 and its corresponding SHM electronic device 200, depends on many different parameters, like for instance structure material (attenuations, ply lay-up, thickness, etc), structure geometry complexity, excitation signals, performance of SHM device, piezo-discs properties, external environmental conditions (temperature, stress, humidity, etc.) and several others. The reconstructed ultrasonic images (two or three dimensional) generated by each SHM set and corresponding to inspection sectors (S1, S2, S3, S4) 310 can be preferably wirelessly 210 sent directly or indirectly (through other linked together SHM electronic devices 200) for visualization on a rugged PC tablet with tactile screen 400 or similar display device easy to be installed permanently or on demand inside SHM system wireless signal coverage. Prior to the visualization, received images should be properly assembled automatically (in space and in time) on the PC tablet 400, in order to visualize them 310 on the screen in a way they are generated by each SHM set (or node) installed on the host structure. This way direct, quick, easy and information full interpretation is assured. Tactile screen could be used for enlargement of desired inspection sector images, for selection of the desired image, view reorientations or other strong and useful visualization tools. The memory size of these images depends on the size of associated inspection sector, necessary resolution to distinguish desired details, quantity of requested or desired data, etc. Connecting wires to the main or auxiliary aircraft system for power supply (12V or 24V) of the SUM electronic devices are not shown on the FIG. 4 for illustrative clarity. SHM electronic devices could also be connected with on board auto harvesting system if available and if there exist some restrictions or limitations for coupling to the main or auxiliary aircraft power supply system. In this exemplary case, FIG. 4, where the number of wireless nodes is small, common wireless protocols, with direct information transfer path can be used in order to download all the data efficiently.

Figure 5:
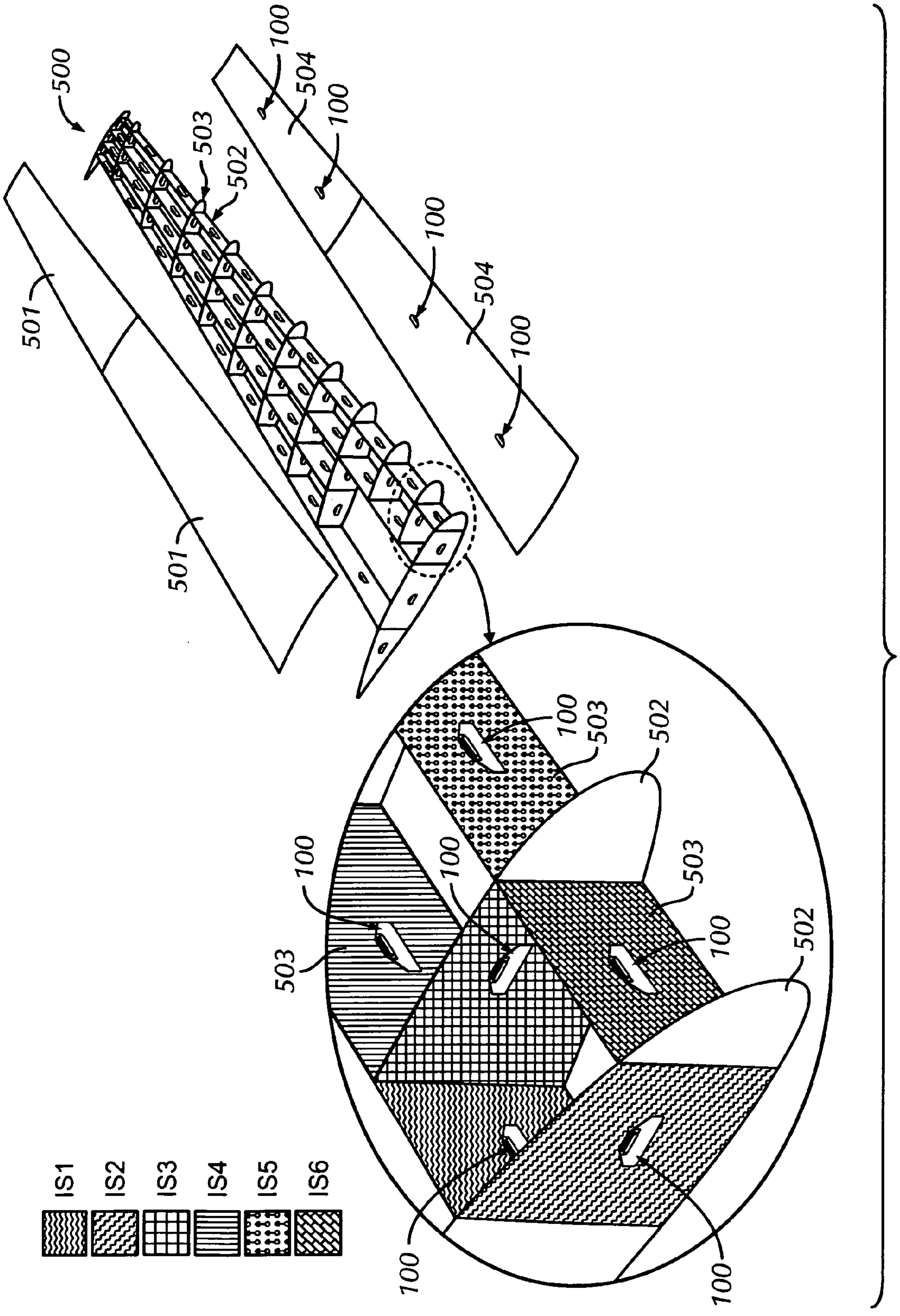
FIG. 5 is an isometric and partially zoomed view of a common aircraft wing interior structure with bonded integrated PhA transducers, one per each wing SHM inspection sector.

FIG. 5 illustrates possible application of a plurality of disclosed PhA transducers for structural health monitoring on a common small aircraft wing 500. Herein, a plurality of PhA transducers 100 are surface bonded onto desired wing inspection sectors, over spars 502, over ribs 503 and over upper 501 and lower wing skin 504. For new wings, this transducer bonding procedure could be preferably performed before final assembly phases in order to have sufficient accessibility necessary for their installation. Of course, it would be recommendable to install PhA transducers and associated SHM devices 200 on each wing structural component (the necessary ones) before the assembly phase, in order to be able to monitor the structure during entire assembly, not only after. Assembly of aircraft structures is also one of critical life cycle phases where damages, overloads, deformations, impacts or similar can occur. This way fulfillment of ever more strict dimensional tolerances of aircraft structures (especially aerodynamic ones) with high quality requirements could be obtained, together with the identification and insight into critical assembly phases. In structural health monitoring during component assembly, subcomponent and final assembly line phases, each SHM device should have a built-in autonomous electric power supply, preferably integrated rechargeable batteries or similar, in order to avoid any inconveniences that cable connections to the suitable on ground electrical power system may cause during common assembly operations, until the structure assembled and prepared to be connected on a final main or auxiliary aircraft electrical power supply system. On enlarged detail of a wing 500 root, a possible distribution of several PhA transducers 100 with respective inspection sectors (IS1 to IS6) or areas is presented, each area with different background in order to distinguish different inspection sectors and inspection coverage areas.

Figure 6:
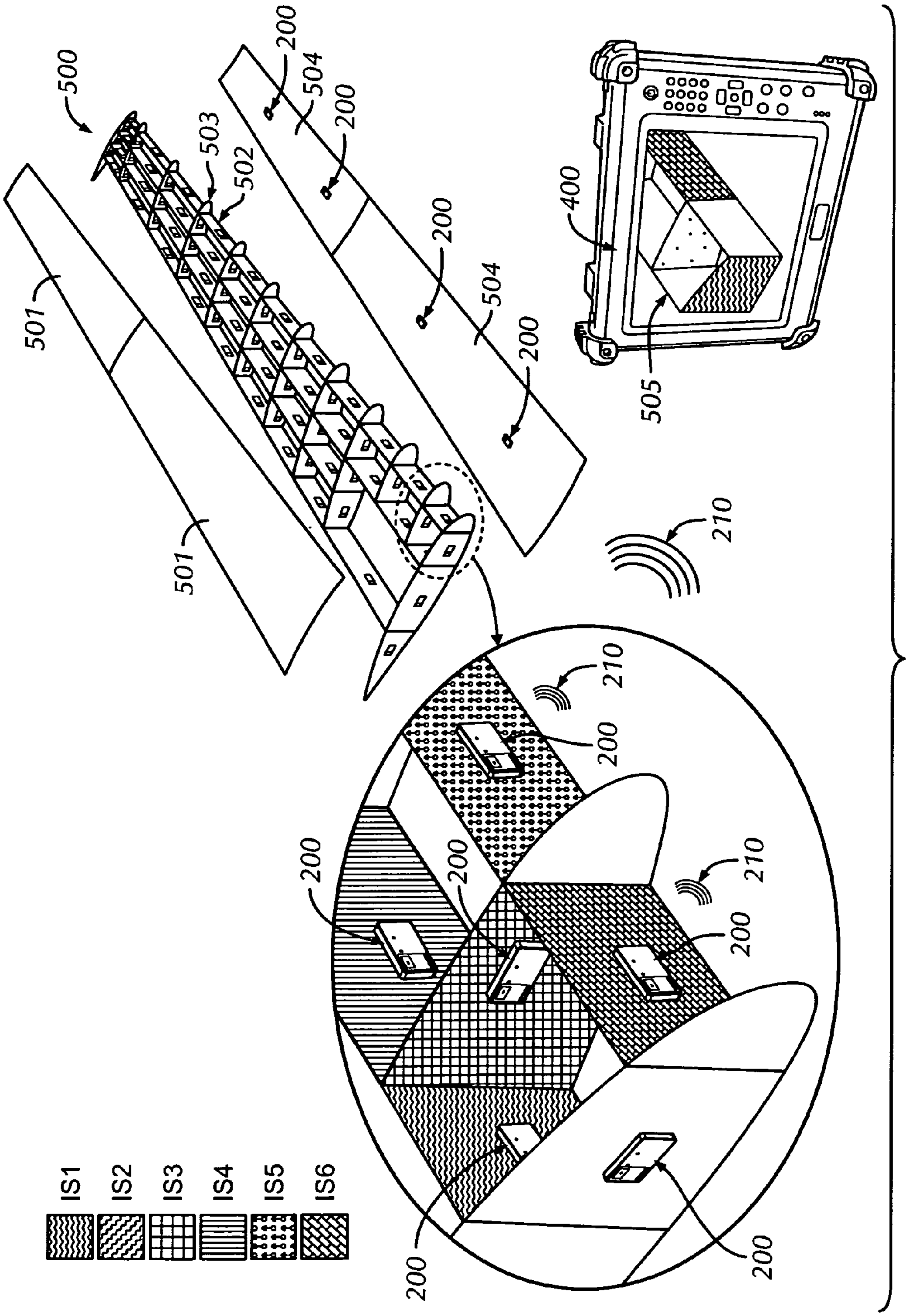
FIG. 6 is an isometric and partially zoomed view of a common aircraft wing interior structure with SHM devices, screw fixed onto integrated PhA transducers, one per each wing SHM inspection sector, and resulting ultrasonic images visualized on a screen.

A step further, on the FIG. 6, per each one of the PhA transducers their corresponding SHM device 200 is affixed above. Once powered and activated, reconstructed ultrasonic images generated by each SHM set can be preferably wirelessly 210 sent directly or indirectly (through other SHM electronic devices 200) for visualization on a rugged PC tablet with tactile screen 400 or similar display device easy to be installed permanently or on demand, inside KIM system wireless signal coverage. Due to the common wing structure complexity, total number of SHM sets, relatively large distances between SHM sets on the outboard part of the wing and final onboard display receiver device 400, use of communication protocols capable to support indirect wireless information transfer paths associated with bidirectional mesh network architectures could be used in order to efficiently download/upload information from/onto all SHM sets and associated inspection sectors. Indirect information transfer paths means that there in no need for the SHM devices to have a direct "communication visibility" or line of sight (LOS) with the final receiver display device 400, but information can travel through other SHM devices 200 in the vicinity in order to find the best path and finally reach the receiver device with the display, like for example 400. This kind of network architecture assures necessary reliability, efficiency and security of the installed SHM system. Connecting wires for power supply (12V or 24V) of the SHM electronic devices are not shown for illustrative clarity. Also lightening or other structural holes on the wing, through which wireless signals could be guided (forming waveguides) and connecting cables deployed, are not shown on the FIG. 6 for illustrative clarity. Similar as on the FIG. 4, once information from all individual KIM nodes received by the PC tablet, appropriate 3D assembly procedure for all images is necessary and very important in order to present them in the realistic way, with the option to see them all by one quick sight. For this three dimensions assembly, already available structural models (generated by commercially available software like CATIA, PRO Engineer, Solid Edge, AutoCAD, etc.) could be reused in order to project obtained reconstructed ultrasonic images or maps onto each corresponding sector, like on the zoomed wing section image 505. The proposed SHM methodology results especially attractive for inspection of principal structural components (ribs, spars, skins, etc.) enclosed inside closed big aircraft structures like wings, stabilizers, ailerons, flaps, winglets, etc. in order to provide required SHM information from the structure interior without need for any disassembly, time or effort cost normally attributed to other conventional manual NDT/NDI/NDE techniques.

It is important to mention that for some of potential applications, mentioned above, there is also a need for data acquisition synchronization of all SHM sets in order to be able to take maximum advantage of obtained information. Of course, there are many possible use case application scenarios, for instance if only data about structural health is of interests, for an aircraft on the ground, there may be no need for synchronization, but if it exist need for stress distribution maps for some specific flight regime, than it is obvious that all SDM maps should be acquired at the same moment, to see which structural sections are critical and where redesigns should be done in order to save mass. By combining SDM maps with SHM data (damage appearance or growth) further potential structural improvements could be identified. Visualization of structural performance indicators in real time (animation) under operational conditions could be another attractive application which would require a high level of SHM system automation, once system installed, powered and activated.

Figure 7:
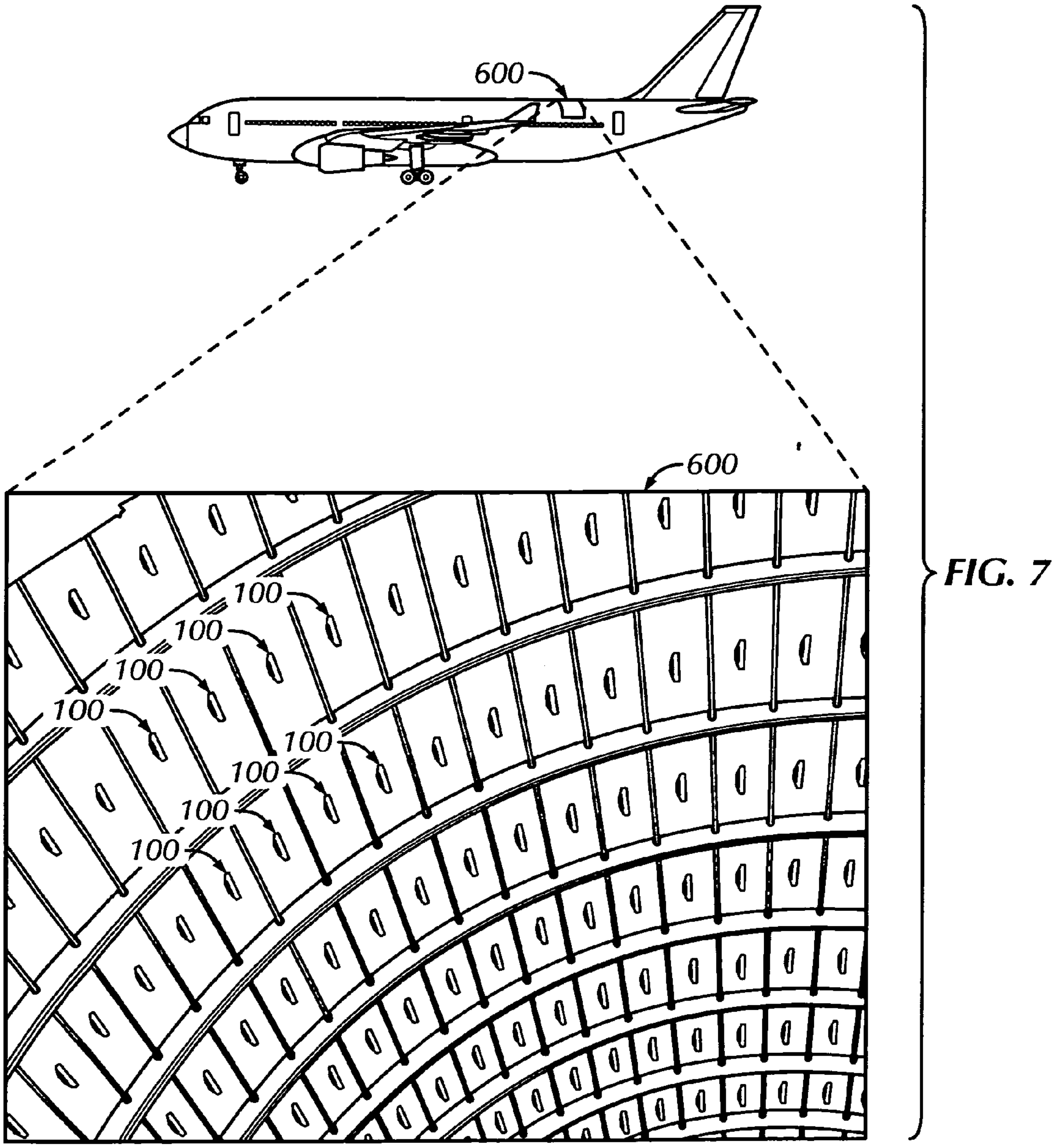
FIG. 7 shows a detail of interior fuselage structure of a common aircraft, with bonded integrated PhA transducers, one per each fuselage SHM inspection sector.

FIG. 7 illustrates possible application of a plurality of disclosed PhA transducers for structural health monitoring on an already existing fuselage portion 600 of a common commercial aircraft. Enlarged detail of the fuselage portion illustrates how PhA transducers 100 could be affixed by bonding, using appropriate structural adhesives, at least one vacuum pump (not shown) and a plurality (one per each PhA transducer) of flexible vacuum suction cups (not shown) sized to cover the whole PhA transducer and with a valve to disable air entrance, once air is suctioned by the pump. This way suction cups would exert necessary mechanical pressure on the PhA transducer 100 in any position, while adhesive curing and until it is fully cured, preferably on a room temperature. In case applied adhesive needs certain higher temperature for curing, suction caps with integrated heating could be applied. For vacuum suction cups, it is recommendable to be made of transparent flexible material in order to make easier possible necessary PhA transducer alignments prior to adhesive curing started. After that, all suction cups could be removed and SHM devices 200 installed and affixed by secured screws assuring reliable union with the PhA transducers and the host structure. This bonding procedure is very practicable and simple for quick in field installations. Of course, other possible and more sophisticated bonding procedures could also be employed.

Figure 8:
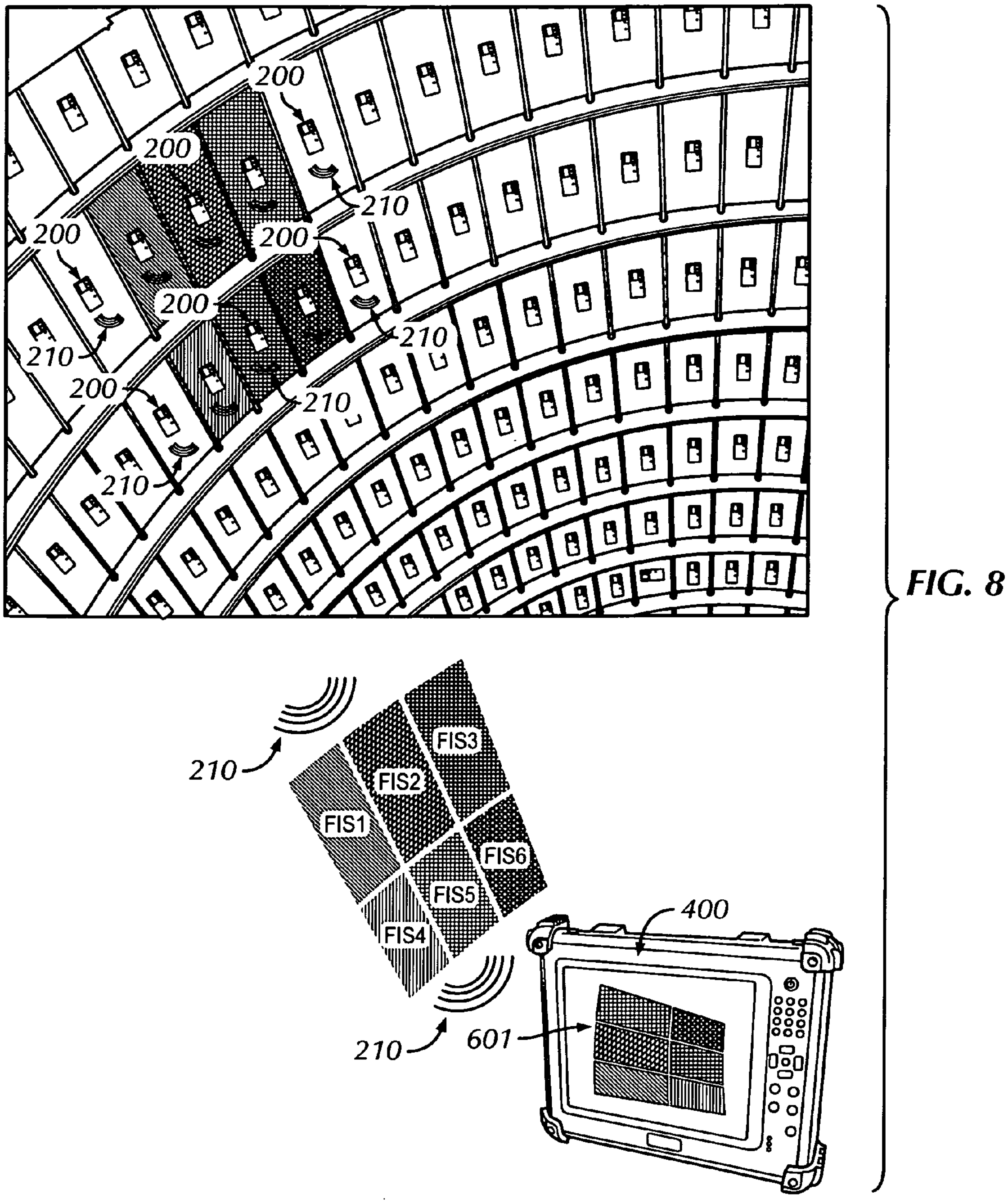
FIG. 8 shows a detail of interior fuselage structure of a common aircraft with SHM devices, screw fixed onto integrated PhA transducers, one per each fuselage SHM inspection sector, and resulting ultrasonic images visualized on a screen.

FIG. 8 further highlights need for subsequent installation of a plurality of SHM devices 200, one per each PhA transducer and an exemplary set of six different fuselage inspection sectors (FIS1 to FIS6). The resulting ultrasonic image corresponding to each SHM set is sent wirelessly 210 to the receiver device with the display, like for example 400 for subsequent image assembly into a realistic visualization 601 on the display. Connecting wires for power supply (12V or 24V) of the SEM electronic devices are not shown on the FIG. 8 for illustrative clarity. Although FIG. 8, shows a plurality of installed KIM devices on the fuselage in a most reasonable application aerospace scenario, another possible application scenario could be to have only one SHM device and inspect the same structure for structural health by removing and installing it over each one of the permanently installed PhA transducer. This option of course could seems cheaper at the first look due to the need to have only one SHM electronic device, but the cost of technical manpower, the necessary time to do these des/installations and attributed operational limitations may not be justifiable.

Figure 9:
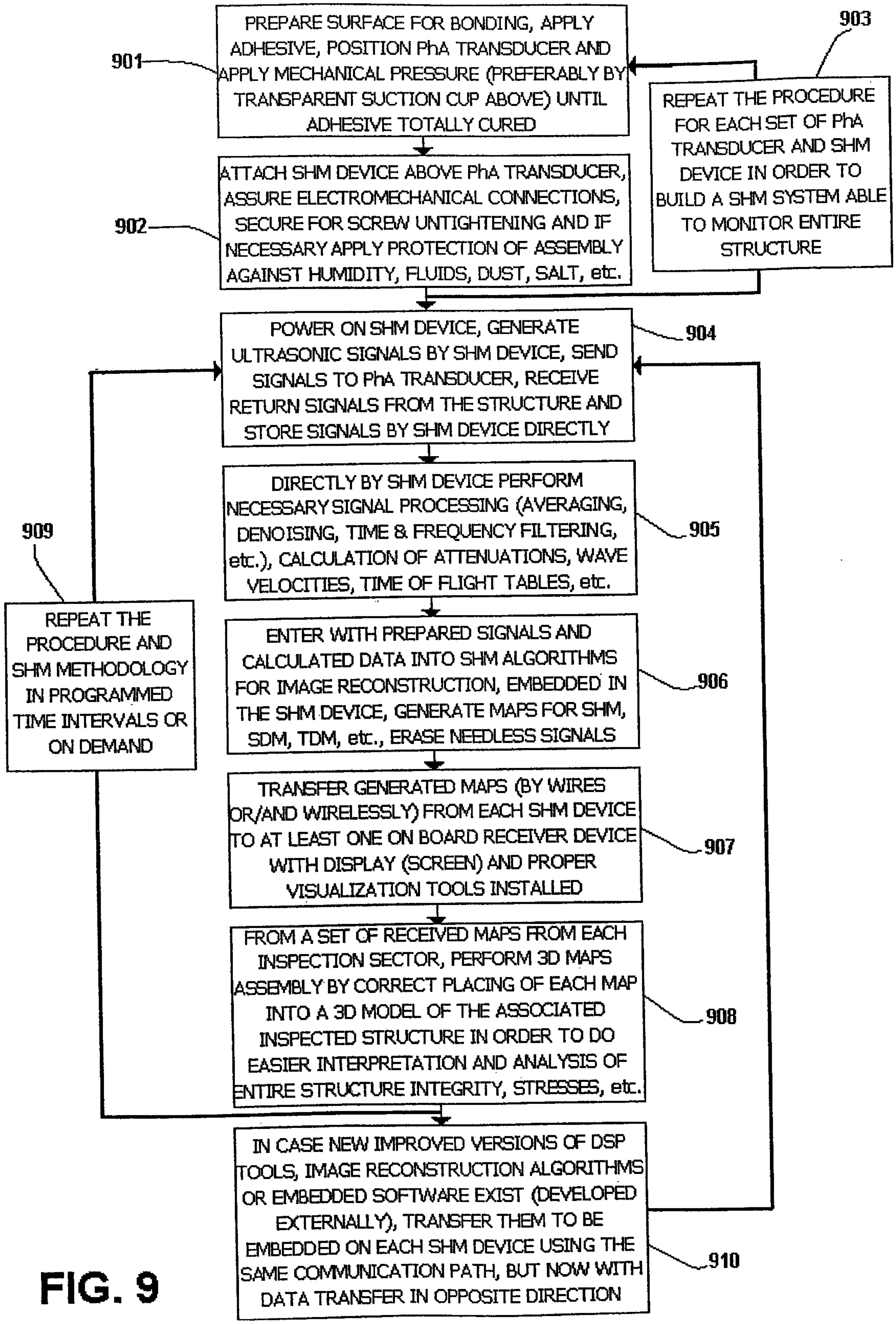
FIG. 9 is a flow chart of an exemplary methodology for SHM in accordance with disclosed invention embodiments.

FIG. 9 is a flow chart of an exemplary methodology for obtaining data about structural health, integrity, condition or structural performance from the structure by use of a plurality of in situ distributed and affixed integrated phased array transducers and SHM devices, wherein each one of these SHM sets is capable to cover a certain inspection area, defined by a host structure features and SHM set performance. In the first step 901 called PhA transducer bonding, surface where each PhA transducer will be bonded should be properly prepared using proper cleaners, chemical activators, etc. which depends a lot of the used adhesive. Further, sufficient adhesive has to be applied and extended, PhA transducer positioned above and preferably aligned in accordance with important structural features, then mechanically pressed by use of suction cup and vacuum pump. It is preferred to use transparent suction cup in order to achieve necessary alignment of the PhA transducer due to possible slips while adhesive is still soft and uncured. Also having a suction cup with a valve that can be closed once vacuum done could make bonding much faster, while with only one vacuum pump and one suction cup per transducer it is possible to bond quickly many transducers over the big structures, like fuselage, wing or other. Once adhesive totally cured, suction cup removed, it follows 902 electromechanical fixations of SHM devices 200, over each one of the PhA transducers 100. Once electromechanically coupled via compatible electromechanical connectors 120 (male and female), the assembly is mechanically affixed by at least two screws 201 and common procedures for screw untightening are applied. This way the PhA transducer is the only carrier or mechanical support for the attached SHM device. If necessary, protection of the entire assembly against humidity, fluids, dusts, salt, etc. by use of silicones, gels, etc. could be applied depending on use scenarios. Steps 901 and 902 should be applied for each set of PhA transducers and SHM devices 903 in order to build a SHM system able to monitor entire structure. In the step further 904, transceiving of ultrasonic waves, signals are generated, acquired and stored by SHM device and resulting ultrasonic waves are transceived into/from the structure by PhA transducer. The step 905 could be called digital signal processing, where each SHM device performs tasks like signal averaging, denoising, time and frequency filtering, calculation of attenuations, wave velocities, time of flight tables, calculation of temperature and stress effects, etc. from the acquired and data stored in the previous step 904. This digital signal processing is necessary in order to continue into the step 906 resulting signals enters into SHM algorithms for image reconstructions embedded in each SHM device and generate all necessary maps, like for example SHM maps, Stress Distribution Maps, Stiffness Distribution Maps, Temperature Distribution Maps, Deformation Distribution Maps, Vibration Distribution Maps, Impact Detection Maps, Leakage Maps, Material characteristics and/or structure mass loss maps. Once maps generated, all needless signals (not maps) on the SHM devices are to be erased in order to make available space to store signals from subsequent acquisitions, mentioned in step 904. In the continuation, in 907 the generated maps from each SHM device are transferred by wires or/and wirelessly to at least one on board receiver (or data concentrator) 400 with display or screen and powerful visualization tools installed. Further on, in 908 from a set of received maps corresponding to each inspection sector, by maps assembly tools, 3D structural models are generated by proper placing of each map onto the associated position of the structure. This way all maps can be visualized more realistically, easily and necessary interpretation, diagnose or analysis of entire structure integrity could be performed. The steps from 904 to 908 are to be repeated 909 in programmed time intervals (preferably embedded in all SHM devices) or performed on demand by use of at least one display receiver. The optional step 910 presents the case when new or improved versions of DSP tools, image reconstruction algorithms or embedded software are developed externally and need to be transferred to each SHM device for uploading, installation or embedding. The same communication pathways, as used for downloading of SHM maps, could be used to make this transfer without need to have direct access to any SHM devices, do any disassembly or grounding of the structure. Of course, communication system has to be designed to function properly in closed structures, like aircraft wings, fuselage, stabilizers, etc.

All herein disclosed innovation embodiments, for easier understanding to those not skilled in the art of SHM field, can be understood as a constitutive parts of a system for intelligent communication between humans and structures, where humans in need to valuate and understand the real state of the structures can use proposed SHM methodology and system, disclosed transducer, electronic SHM device (only partially disclosed herein), necessary interpretation techniques and language (not disclosed herein) and a display for image interpretation. Very similar to already known communication technology concepts like, Machine to Machine (M2M), Human to Machine (H2M or M2H) communication and reverse, each day more and more, Human to Structure (H2S or S2H) is an emerging communication concept with a great growth potential (very attractive to providers of telecommunication services, manufacturers of smart integrated electronic devices, data banks providers and managers, etc.), characterized by enormous number of potential "clients" (structural inspection sectors), quantity of transferred data from each one of them, communication duration, calls frequency, in systems with on line data analysis, processing and storage, etc. The essential features of the invention include permanently bonded to a structure, an integrated Phased Array (PhA) structural radar transducer that can provide reliable electromechanical connection with corresponding sophisticated miniaturized electronic "all in one" SHM device installed directly above it, without need for any interface cabling, during entire aerospace structure lifecycle and for a huge variety of real harsh service environments of structures to be monitored is presented. The integrated PhA transducer consists of a set of aligned piezo-electric discs with wrap round electrodes for transceiving of elastic ultrasonic waves, plurality of electrical traces and contact pads, several layers of a flexible printed circuit board, electromagnetic shielding between channels and overall, one electromechanical multipinned connector and all that integrated into one small unit easy for surface installation by bonding and final application on real structures. This invention is intentioned to be used for numerous important real time or on demand applications like: structural health monitoring, temperature distribution mapping, deformation distribution mapping, stress distribution mapping, stiffness distribution mapping, vibration distribution mapping, characterization of structure material physical properties, impact detection, leakage detection, etc. and all that during almost all phases of structure life cycle, like manufacturing process, curing, assembly, certification testing, flight testing, maintenance and real service. The invention is an important prerequisite toward future real extensive application of distributed structural health monitoring systems on common aircraft structures with in situ processing, quick reports generation about real structural health, status, condition or performance. This integrated PhA transducer, as a key component of SHM (Phased Array monitoring for Enhanced Life Assessment) system, has two principal tasks at the same time, reliably transceive elastic waves and serves as a reliable sole carrier or support for associated sophisticated SHM electronic device attached above.

While specific embodiments of the invention have been illustrated and described herein, as noted above, those of ordinary skills in the art appreciate that any arrangement which is calculated to achieve the same purpose may be substituted for the specific embodiments shown and that the invention has other applications in other environments. This application is intended to cover any adaptations or variations of the present invention. Many modifications and variations are possible in view of the above teachings. The embodiments were chosen and described in order to best explain the principles of the invention and its practical applications, to whereby enable others skilled in the art to best utilize the invention and various embodiments with various modifications as are suited to the particular use contemplated. The following claims are in no way intended to limit the scope of the invention to the specific embodiments described herein.

The invention claimed is:

1. An integrated phased array transducer, comprising:

an array of wrap around piezo-electric disks for transceiving waves into/from the structure, a plurality of conductive wire traces guiding electric signals from said disks to electrical contacts, a plurality of adhesive contacts coupling said wire traces with said piezo-electric disks and said wire traces with said contacts, a plurality of holes in each of the layers for allowing said contacts, several non-conductive layers for integration or encapsulation purposes, and an electrically non conductive flexible layer or level equalization with an extended hole allowing unrestricted actuation of piezo-electric disks in radial direction.

2. The integrated phased array transducer of claim 1, further comprising at least one electromechanical connector accessible on an upper side for electromechanical coupling, said connector having soldering pins connected to the plurality of conductive wire traces on a lower side thereof; at least one stiffening ring integrated around the electromechanical connector bonded onto encapsulation layers.

3. The integrated phased array transducer of claim 2, wherein the integrated multipinned electromechanical connector comprises at least two threaded holes for mechanical fastening with the structural health monitoring electronic device by fasteners.

4. The integrated phased array transducer of claim 1, further comprising a plurality of conductive wire traces forming a closed loop around each of the signal transmitting wire traces providing internal electromagnetic interference shielding; at least two interconnected electrically conductive layers for external electromagnetic interference shielding, a lower layer and an upper layer made of a suitable plastic material embedding a conductive mesh or woven fabric.

5. The integrated phased array transducer of claim 4, wherein said transducer is flexible enough to be bonded onto a curved surface and once bonded being stiff enough to carry above corresponding structural health monitoring device, said transducer supporting associated transferred inertial loads, so as to assure during structure service or life cycle reliable electromechanical interconnection.

6. The integrated phased array transducer of claim 5, further comprising an identification tag which is provided or stored in a small chip integrated within the transducer, wherein the stored information of the tag comprises a date associated with transducer physical properties or features essential for adjustments of structural health monitoring device configurations, signal processing and algorithms for image reconstruction and analysis of structural integrity.

7. The integrated phased array transducer of claim 6, further comprising perceptible horizontal and vertical alignment markers allowing verification of the correct positioning during bonding procedure of center lines of the piezoelectric discs array of the transducer onto the host structure and in accordance with other structure features, such as holes, stiffeners and edges.

8. The integrated phased array transducer of claim 4, wherein said conductive mesh is made of a material selected from the group including aluminium, copper and nickel.

9. A method for obtaining data related to structural health, integrity, condition or structural performance from the structure by use of a plurality of in situ distributed integrated phased array transducers and structural health monitoring devices, wherein each one of these structural health monitoring sets is capable to cover a certain inspection area, defined by a host structure features and structural health monitoring set performance, wherein the method comprises the following steps:

preparation of surface for bonding, permanent installation of integrated phased array transducer (preferably by bonding), on a predetermined inspection sector of the host structure; repeating the previous step for each integrated PhA transducer of the entire structural health monitoring system; attaching of the structural health monitoring electronic device(s) with compatible connector above the PhA transducer(s), providing electromechanical connection and secure for untightening; electrical powering of the structural health monitoring device(s) and activation, so as to perform by each structural health monitoring device signal generation, signal acquisition, signal conversion, signal conditioning, signal triggering, high speed channel multiplexing, etc.; performing digital signal processing by structural health monitoring devices, where this processing may include signal averaging, signal, de-noising, time and frequency filtering, calculation of attenuations, wave velocities, time of flight tables, calculating of temperature and stress effects, etc.; entering with prepared signals and calculated data from the previous step into structural health monitoring algorithms for image reconstruction embedded in the structural health monitoring devices in order to generate maps for structural health monitoring, Stress Distribution Maps, Stiffness Distribution Maps, Temperature Distribution Maps, Deformation Distribution Maps, Vibration Distribution Maps, Impact Detection Maps, Leakage Maps, Material characteristics and/or structure mass loss maps, wherein unnecessary data is erased to provide free place to store signal from subsequent acquisitions; transferring of generated maps by wires or/and wirelessly from each structural health monitoring device to at least one on board receiver device with display and proper visualization tools installed; assembly and projection of all received maps from each inspection sector and structural health monitoring device into a three dimensional model of the structure, by placing each map to a corresponding position inside the three dimensional model in order to provide easier interpretation and analysis of entire structure integrity, stress distribution, temperature distribution, stiffness distribution or other useful data like impact or leakage detection; transfer new versions of digital signal processing tools, image reconstruction algorithms or software for embedding, from receiver device to each structural health monitoring device by use of the same communication pathways as used for transfer of the structural health monitoring maps; install or embed new digital signal processing tools, algorithms or software on each structural health monitoring device and than continue the SHM methodology with improved software features.

10. A structural health monitoring system based on a plurality of in situ (or in place, to confirm everything functions properly as a system) distributed structural health monitoring sets, where each said set transceiving ultrasonic waves to and from the structural surface, said system comprising each said set consisting of one integrated phased array transducer and at least one structural health monitoring electronic device electromechanically coupled and attached above through compatible electromechanical connector, each SHM structural health monitoring electronic device, once powered and activated performs tasks of signal generation, signal acquisition, signal conversion, signal conditioning, signal triggering, multiplexing, digital signal processing, two dimensional and three dimensional image reconstruction and generation, data storage, data management, data analysis and data transmission.

11. The system of claim 10, wherein each said structural health monitoring electronic device performs further tasks, providing clients with easy to interpret information full images comprising at least one of the following data: Structural Health Monitoring Maps, Stress Distribution Maps, Stiffness Distribution Maps, Temperature Distribution Maps, Deformation Distribution Maps, Vibration Distribution Maps, Impact Detection, Leakage, Material Characterization or host structure Mass Loss.

* * * * *